US008733489B2

(12) United States Patent
Heine et al.

(10) Patent No.: US 8,733,489 B2
(45) Date of Patent: May 27, 2014

(54) VEHICLE OVERSPEED PROTECTION SYSTEM

(75) Inventors: Karl G. Heine, Dubuque, IA (US); David R. Didelot, Asbury, IA (US); David F. Rindfleisch, Dubuque, IA (US); Carl R. Starkey, Dubuque, IA (US)

(73) Assignee: Deere & Company, Moline, IL (US)

( * ) Notice: Subject to any disclaimer, the term of this patent is extended or adjusted under 35 U.S.C. 154(b) by 536 days.

(21) Appl. No.: 13/027,998

(22) Filed: Feb. 15, 2011

(65) Prior Publication Data
US 2012/0205178 A1 Aug. 16, 2012

(51) Int. Cl.
*B60K 31/02* (2006.01)
(52) U.S. Cl.
USPC .......................................... 180/170; 180/179
(58) Field of Classification Search
USPC .................................. 180/170, 174, 178, 179
See application file for complete search history.

(56) References Cited

U.S. PATENT DOCUMENTS

| | | | |
|---|---|---|---|
| 3,931,870 A | 1/1976 | Memmer | |
| 3,946,973 A | 3/1976 | Budway et al. | |
| 4,324,320 A | 4/1982 | Spurlin et al. | |
| 4,349,233 A | 9/1982 | Bullard et al. | |
| 4,477,124 A | 10/1984 | Watanabe | |
| 4,485,444 A | 11/1984 | Maruyama et al. | |
| 4,631,778 A | 12/1986 | Kocon et al. | |
| 4,662,511 A | 5/1987 | Greener | |
| 4,809,836 A | 3/1989 | Zilber | |
| 4,828,079 A | 5/1989 | Fujinami | |
| 4,846,316 A | 7/1989 | Fujinami | |
| 5,045,739 A | 9/1991 | Kuwahara | |
| 5,247,378 A | 9/1993 | Miller | |
| 5,303,986 A | 4/1994 | VanDeMotter et al. | |
| 5,613,744 A | 3/1997 | Eslinger et al. | |
| 5,618,084 A * | 4/1997 | Reiner | 303/3 |
| 5,685,619 A | 11/1997 | Brown | |
| 5,941,614 A | 8/1999 | Gallery et al. | |
| 6,092,595 A | 7/2000 | Fecht et al. | |
| 6,273,571 B1 | 8/2001 | Sharp et al. | |
| 6,299,263 B1 * | 10/2001 | Uematsu et al. | 303/192 |
| 6,641,662 B2 | 11/2003 | Radojevic et al. | |
| 6,695,416 B1 | 2/2004 | Reiner | |
| 7,046,133 B2 | 5/2006 | Weast et al. | |
| 7,225,059 B2 | 5/2007 | Kettenacker et al. | |
| 7,249,810 B2 | 7/2007 | Grupp et al. | |
| 7,477,348 B2 | 1/2009 | Watanabe | |
| 7,561,954 B2 * | 7/2009 | Aizawa et al. | 701/79 |

(Continued)

FOREIGN PATENT DOCUMENTS

EP 0937885 A2 8/1999

OTHER PUBLICATIONS

Adaptive Cruise Control System Overview, 5$^{th}$ Meeting of the U.S. Software System Safety Working Group, Apr. 12-14$^{th}$, 2005, Anaheim, California.

(Continued)

*Primary Examiner* — Jeffrey J Restifo
(74) *Attorney, Agent, or Firm* — Faegre Baker Daniels LLP

(57) ABSTRACT

An articulated vehicle is provided having a cab portion, a trailer portion, and a coupling assembly positioned between the cab portion and the trailer portion. A front wheel assembly may support the cab portion, and a rear wheel assembly may support the trailer portion. The vehicle may include an overspeed protection system configured to protect the vehicle from an overspeed condition.

30 Claims, 5 Drawing Sheets

(56) References Cited

U.S. PATENT DOCUMENTS

| | | |
|---|---|---|
| 7,602,311 B2 * | 10/2009 | Price .................... 340/903 |
| 7,664,589 B2 * | 2/2010 | Etori et al. ................ 701/96 |
| 7,672,771 B2 | 3/2010 | Nakanishi et al. |
| 7,693,642 B2 | 4/2010 | Anderson et al. |
| 7,739,021 B2 | 6/2010 | Wegeng et al. |
| 7,869,927 B2 | 1/2011 | Uematsu |
| 8,078,382 B2 * | 12/2011 | Sugano et al. ............... 701/96 |
| 8,214,123 B2 * | 7/2012 | Inoue et al. ................ 701/93 |
| 8,214,125 B2 * | 7/2012 | Nanami .................... 701/93 |
| 8,424,507 B2 * | 4/2013 | Reedy ..................... 123/320 |
| 2005/0137060 A1 * | 6/2005 | Kuras et al. ................ 477/214 |
| 2009/0071777 A1 | 3/2009 | Weber et al. |
| 2010/0137102 A1 | 6/2010 | Sopko, Jr. et al. |

\* cited by examiner

VEHICLE OVERSPEED PROTECTION SYSTEM

FIELD

The present disclosure relates to an overspeed protection system, and more particularly to an automatic braking system for protecting an articulated vehicle from an overspeed condition.

BACKGROUND AND SUMMARY

Articulated vehicles, such as articulated dump trucks (ADT's), are known in the art. For example, ADT's typically include a cab portion having a first frame supporting an operator cab, and a trailer portion having a second frame supporting a dump body. The dump body may be configured to contain a load and is typically coupled to an actuator for angular movement relative to the second frame. The first frame and the second frame may be operably coupled through an articulation joint. A front wheel assembly coupled to the first frame may provide rolling support to the cab portion, and a rear wheel assembly coupled to the second frame may provide rolling support to the trailer portion.

Articulated vehicles may approach an overspeed condition when the powertrain components reach speeds exceeding design limits. For example, an overspeed condition may occur when the articulated vehicle reaches a top speed in a top gear and the vehicle continues to gain speed. Such an overspeed condition may present a risk of damage to the engine, transmission, or other drivetrain components.

According to an embodiment of the present disclosure, a work vehicle is provided including an engine having a throttle device and a transmission coupled to the engine. A chassis includes a cab portion, a trailer portion, and a coupling device positioned between the cab portion and the trailer portion. The cab portion includes a first frame and the trailer portion including a second frame, and the coupling device is configured to provide pivoting movement of the trailer portion relative to the cab portion. A front wheel assembly is configured to support the cab portion. The front wheel assembly includes a first axle and a pair of wheels coupled to the first axle. A rear wheel assembly is configured to support the trailer portion. The rear wheel assembly includes a second axle and a pair of wheels coupled to the second axle. A drive shaft is coupled between the first wheel assembly and the second wheel assembly. A brake is coupled to at least one of the front and rear wheel assemblies and is configured to apply a braking force to the at least one of the front and rear wheel assemblies. A sensor is configured to detect a speed of the vehicle, and a controller is in communication with the brake and the sensor. The controller is configured to control an opening of the throttle device of the engine. The controller is configured to automatically reduce the opening of the throttle device upon the detected vehicle speed being outside a first threshold range and to automatically actuate the brake upon the detected vehicle speed being outside a second threshold range, the second threshold range being greater than the first threshold range.

According to another embodiment of the present disclosure, a vehicle is provided including a front portion having a front frame, an engine supported by the front frame, and a transmission coupled to the engine. The vehicle includes at least one of a retarder coupled to the transmission and a parasitic load coupled to the engine. Activation of the at least one of the retarder and the parasitic load is configured to inhibit a rotation of the transmission. A front wheel assembly is operably coupled to the front frame to support the front portion. The front wheel assembly includes a first axle and a pair of wheels coupled to the first axle. The vehicle further includes a trailer portion including a rear frame. A rear wheel assembly is operably coupled to the rear frame to support the trailer portion, the rear wheel assembly including a second axle and a pair of wheels coupled to the second axle. A frame coupling is positioned between the front frame and the rear frame, the frame coupling being configured to provide pivoting movement between the front frame and the rear frame. A drive shaft is coupled between the front wheel assembly and the rear wheel assembly. A brake is coupled to at least one of the front and rear wheel assemblies and is configured to apply a braking force to the at least one of the front and rear wheel assemblies. A sensor is configured to detect a speed of the transmission. A controller is in communication with the brake, the sensor, and the at least one of the retarder and the parasitic load. The controller is configured to automatically activate the at least one of the retarder and the parasitic load upon the detected transmission speed being outside a first threshold range and to automatically actuate the brake upon the detected transmission speed being outside a second threshold range, the second threshold range being greater than the first threshold range.

According to yet another embodiment of the present disclosure, an overspeed protection method for a vehicle is provided. The method includes providing a vehicle including a cab portion, a trailer portion, a drive train, and a coupling device positioned between the front portion and the trailer portion. The coupling device is configured to provide pivoting movement between the trailer portion and the cab portion. The cab portion includes a front wheel assembly, and the trailer portion includes a rear wheel assembly. At least one of the front wheel assembly and the rear wheel assembly include a brake. The drive train includes an engine and a transmission coupled to the engine. The method further includes detecting a speed of the drive train, comparing the detected speed to a first threshold range, and reducing a throttle demand to the engine upon the detected speed being outside the first threshold range. The method further includes comparing the detected speed to a second threshold range, the second threshold range being greater than the first threshold range, and activating the brake upon the detected speed being outside the second threshold range.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the inven-

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
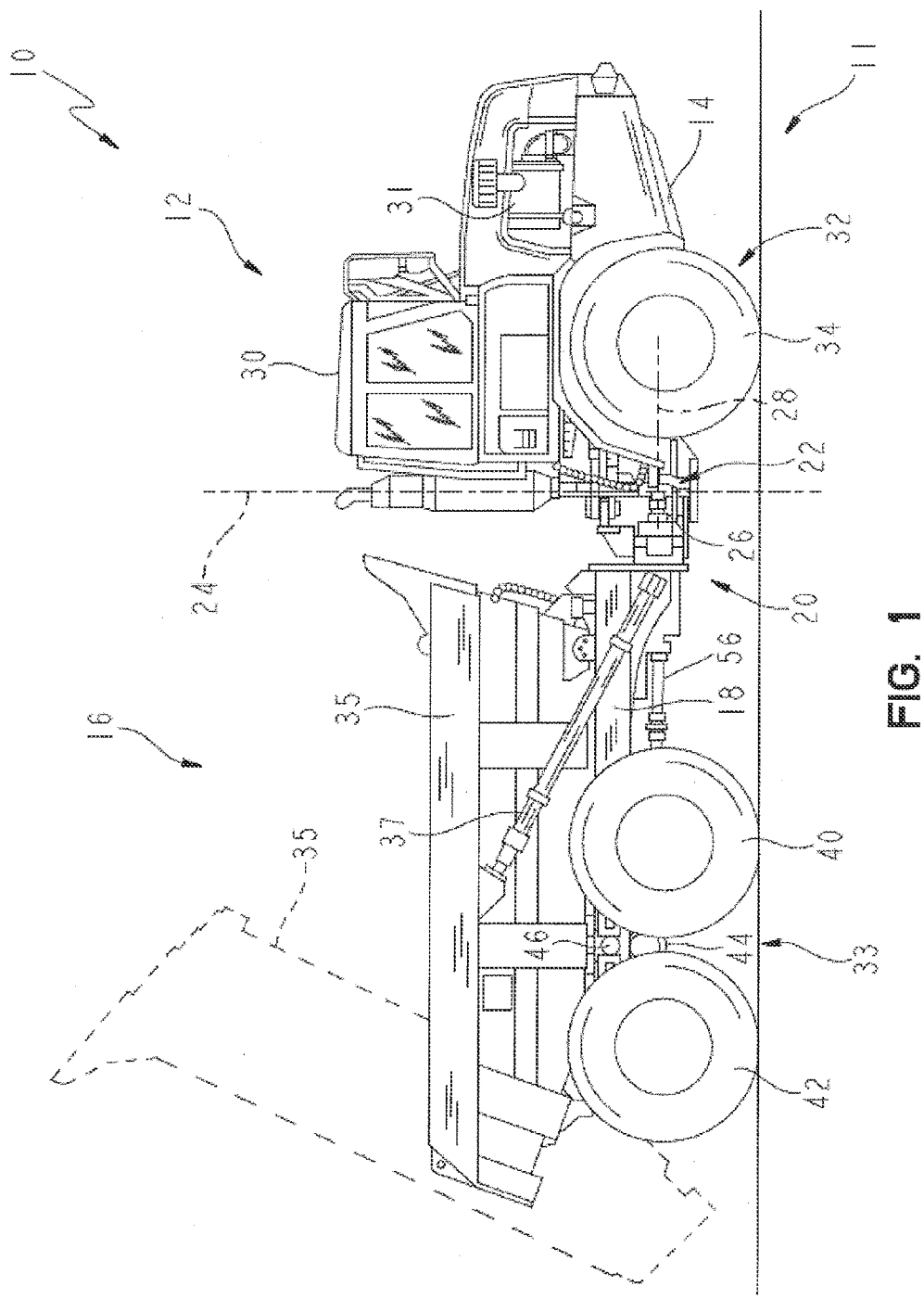
FIG. 1 illustrates an exemplary articulated vehicle incorporating the overspeed protection system of the present disclosure.

Referring initially to FIG. 1, an exemplary articulated vehicle 10 includes a chassis 11 having a first or cab portion 12 and a second or trailer portion 16. Cab portion 12 includes a first frame 14, and trailer portion 16 includes a second frame 18. First frame 14 is connected to second frame 18 through a coupling assembly 20. In the illustrated embodiment, coupling assembly 20 includes a pivot frame coupling 22 and a rotational frame coupling 26. Pivot frame coupling 22 provides for articulated movement, or pivoting, of second frame 18 relative to first frame 14 about a vertical axis 24. Rotational frame coupling 26 provides for rotational movement of second frame 18 relative to first frame 14 about a longitudinal axis 28. In one embodiment, vehicle 10 includes one or more hydraulic actuators configured to control the angle between first and second frames 14, 18 for steering vehicle 10.

First frame 14 illustratively supports an operator's cab 30 and an engine 31 for propelling vehicle 10. A first or front wheel assembly 32 supports cab portion 12 and is operably coupled to first frame 14. First wheel assembly 32 includes a pair of wheels 34 for providing rolling support to cab portion 12. A bin or dump body 35 for containing a load is supported by second frame 18. An actuator, such as a hydraulic cylinder 37, may be coupled to dump body 35 for angularly elevating dump body 35 relative to second frame 18 (as shown in phantom in FIG. 1).

Figure 2:
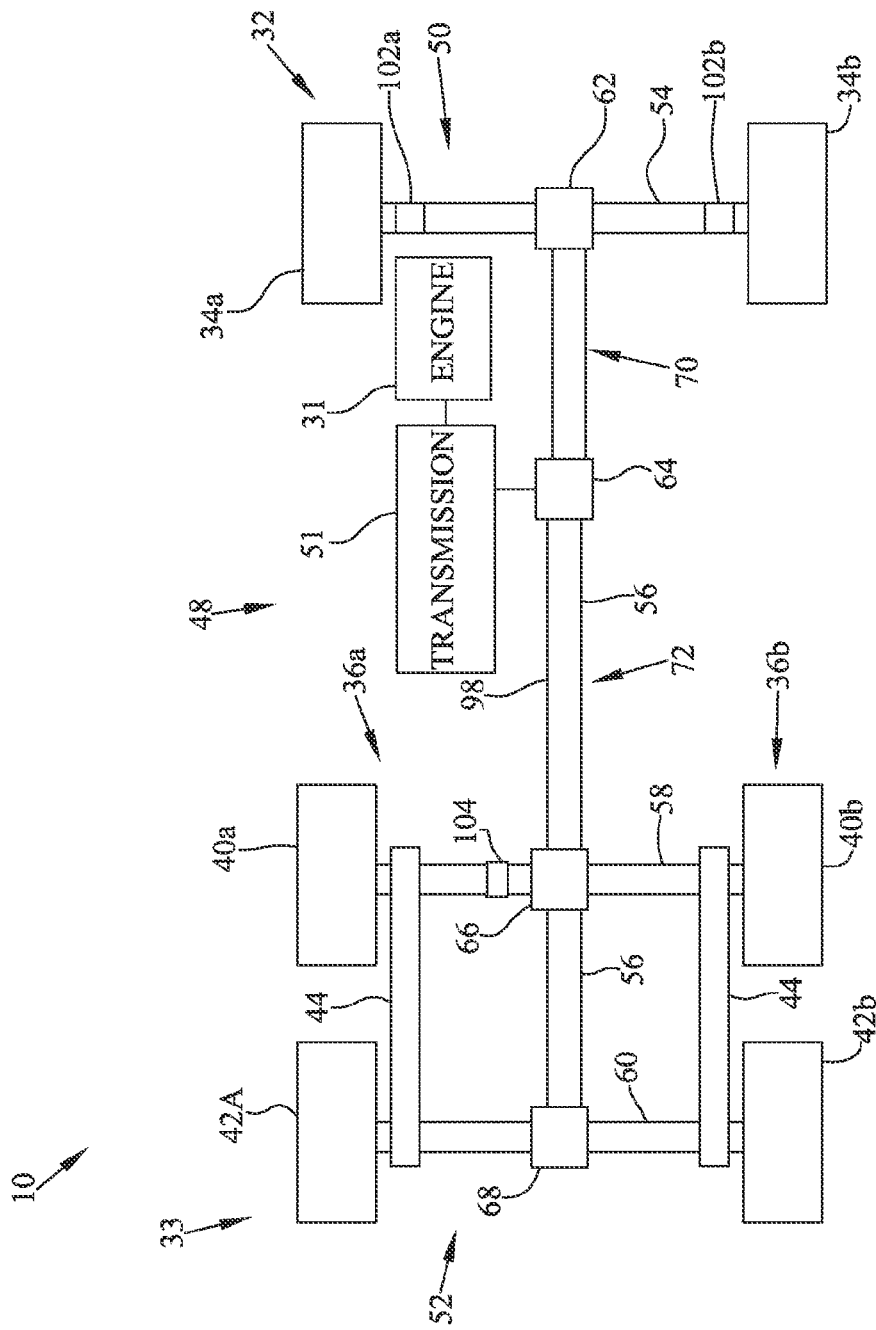
FIG. 2 illustrates a top schematic view of an exemplary drive train of the articulated vehicle of FIG. 1 with a front wheel assembly and a rear wheel assembly.

A second or rear wheel assembly 33 is operably coupled to second frame 18 for supporting trailer portion 16. In the illustrated embodiment, rear wheel assembly 33 includes front wheels 40 and rear wheels 42. Referring to FIG. 2, rear wheel assembly 33 illustratively includes a left rear wheel assembly 36a and a right rear wheel assembly 36b. Left and right rear wheel assemblies 36a, 36b each illustratively include a front wheel 40a, 40b and a rear wheel 42a, 42b, respectively. In the illustrated embodiment, each of front wheels 40a, 40b and rear wheels 42a, 42b are rotatably coupled to a tandem or walking beam 44 (see also FIG. 5). As illustrated in FIG. 1, tandem 44 is pivotally coupled to second frame 18 through a pivot tandem coupling 46. Operation of tandem 44 facilitates pivoting movement of front wheel 40 relative to rear wheel 42 about coupling 46, thereby facilitating continuous ground engagement by wheels 40 and 42. In the illustrated embodiment, coupling 46 consists of a rigid shaft that extends from second frame 18 to tandem 44 to provide the pivoting therebetween. Other than rotation, shaft 46 illustratively has a fixed position relative to second frame 18 such that shaft 46 moves vertically, longitudinally, and laterally with second frame 18.

In the illustrated embodiment, front and rear wheels 40 and 42 are at a fixed distance from shaft 46. As a result, the vertical location of the axis of rotation of front and rear wheels 40 and 42 relative to second frame 18 is independent of the load carried by dump body 35. In the illustrated embodiment, because rigid shaft 46 is directly coupled to second frame 18 and tandem 44, the spring constant between second frame 18 and tandem 44 is large so that there is substantially no body roll between second frame 18 and tandem 44.

Vehicle 10 may include alternative wheel assembly configurations. For example, fewer or more wheels and/or axles may support trailer portion 16 and/or cab portion 12.

Referring to FIG. 2, an exemplary drive train 48 of vehicle 10 is illustrated. Engine 31 is coupled to a drive shaft 56 via a transmission 51 for driving front and rear wheel assemblies 32, 33. In the illustrative embodiment, transmission 51 is an automatic transmission controlled and modulated by a transmission controller 116 (see FIG. 3), although other types of transmissions may be provided. Front wheel assembly 32 includes a front axle assembly 50, and rear wheel assembly 33 includes a bogie or rear axle assembly 52. Front axle assembly 50 illustratively includes a front axle 54 coupled between wheels 34a, 34b and a differential 62 coupled to front axle 54. Bogie axle assembly 52 includes a first rear axle 58 coupled between wheels 40a, 40b and a second rear axle 60 coupled between wheels 42a, 42b. In the illustrated embodiment, first axle 58 includes a first differential 66 and second axle 60 includes a second differential 68. Tandems 44 of left and right rear wheel assemblies 36a, 36b are further included in bogie axle assembly 52 and coupled to first and second axles 58, 60.

Front brakes 102a, 102b are coupled to front axle 54 for applying a braking force to front axle 54. Fewer or additional front brakes 102 may be coupled to front axle assembly 52. A rear brake 104 is illustratively coupled to first axle 58 for applying a braking force to both rear axles 58, 60. In particular, a rear brake 104 coupled to first rear axle 58 may apply braking torque to second rear axle 60 through drive shaft 56. Alternatively, fewer or additional rear brakes 104 may be coupled to bogie axle assembly 52 for braking first and second axles 58, 60. For example, additional rear brakes 104 may be coupled to first axle 58, and one or more rear brakes 104 may be coupled to second axle 60. In one embodiment, brakes 102, 104 are hydraulically-actuated disc brakes, although brakes 102, 104 may be other suitable types.

Drive shaft 56 is coupled to front axle 54 of front axle assembly 50 and to first and second axles 58, 60 of bogie axle assembly 52. Drive shaft 56 is configured to provide torque from transmission 51 and engine 31 to front axle 54 and first and second axles 58, 60 for propelling vehicle 10. In particular, differential 62 of front axle 54 is coupled to drive shaft 56 and is configured to provide torque from drive shaft 56 to each wheel 34a, 34b while allowing wheels 34a, 34b to rotate at different speeds. Similarly, differentials 66, 68 of respective axles 58, 60 are coupled to drive shaft 56 and are configured to provide torque from drive shaft 56 to respective wheels 40, 42 while allowing individual wheels 40, 42 to rotate at different speeds.

In the illustrated embodiment, drive shaft 56 includes an inter-axle differential 64 configured to allow axles 58, 60 to rotate at different speeds than front axle 54 during operation of vehicle 10. As illustrated in FIG. 2, drive shaft 56 includes a first portion 70 coupled between front axle assembly 50 and differential 64 and a second portion 72 coupled between differential 64 and bogie axle assembly 52. Front axle 54 is coupled to first portion 70, and first and second axles 58, 60 are coupled to second portion 72. Differential 64 serves to allow first portion 70 and second portion 72 of drive shaft 56 to rotate at different speeds during operation of vehicle 10, thereby allowing front axle 54 to rotate at different speeds than first and second axles 58, 60. In the illustrated embodiment, transmission 51 is coupled to differential 64 for driving drive shaft 56. In one embodiment, transmission 51 and differential 64 are provided in a single assembly, and an output shaft 98 of transmission 51 forms a part of second portion 72 of drive shaft 56. Alternative configurations of coupling transmission 51 to drive shaft 56 may be provided.

Differential 64 may include a differential lock, such as a clutch, for selectively locking differential 64. When differential 64 is locked, first portion 70 of drive shaft 56 is locked to second portion 72 to rotate therewith. See, for example, the automatic differential lock system described in co-pending patent application Ser. No. 13/027,966 entitled "Auto Inter-Axle Differential Lock Engagement for Improved Reverse Braking Capacity," filed on Feb. 15, 2011, the disclosure of which is expressly incorporated by reference herein.

Figure 3:
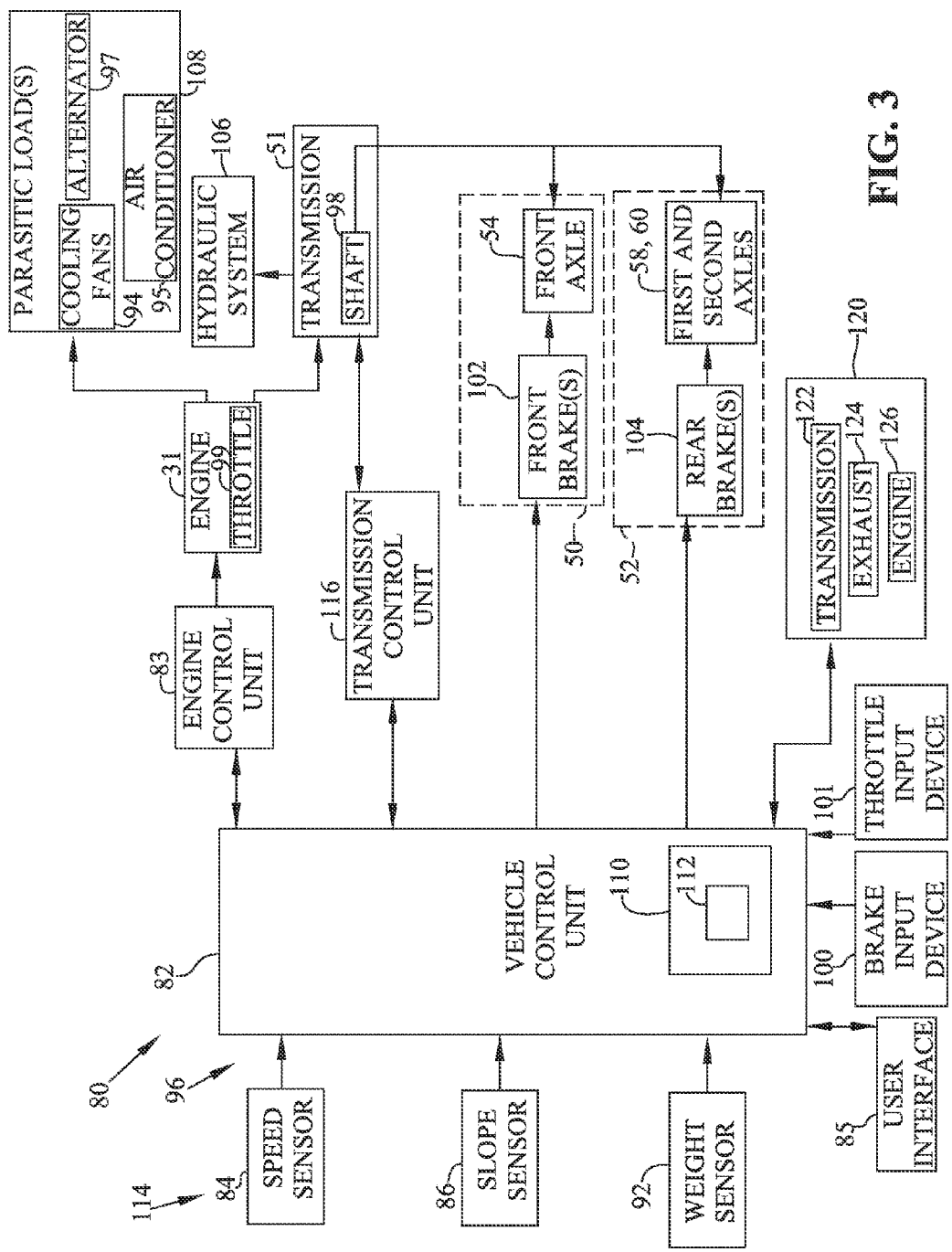
FIG. 3 illustrates a representative view of an exemplary overspeed protection system of the vehicle of FIG. 1.

Referring to FIG. 3, an exemplary overspeed protection system 80 of vehicle 10 is illustrated. Overspeed protection system 80 is configured to initiate various levels of overspeed protection upon detection of vehicle 10 approaching an overspeed condition. Vehicle 10 may approach an overspeed condition when the components of drive train 48, including engine 31, transmission 51, and drive shaft 56, for example, reach speeds that meet or exceed design limits. An overspeed condition may occur when vehicle 10 reaches a top speed in a top transmission gear and continues to gain speed. For example, vehicle 10 may approach an overspeed condition when traveling down a slope in a top gear and increasing momentum or inertia results in continued speed gain. In a manual transmission vehicle, an overspeed condition may occur when drive train components reach top speeds in any of the transmission gears.

Vehicle 10 illustratively includes a vehicle or chassis controller 82 configured to control devices and systems of vehicle 10 and an engine controller 83 configured to control engine 31. Vehicle 10 illustratively also includes transmission controller 116 for controlling and modulating transmission 51. In the illustrated embodiment, vehicle controller 82 is configured to control brakes 102, 104 based on input from a brake input device 100 and other control inputs. Vehicle controller 82 is also configured to communicate with engine controller 83 for controlling engine 31 and with transmission controller 116 for controlling transmission 51. For example, vehicle controller 82 provides a throttle command to controller 83 for controlling the position or opening of a throttle plate 99 of engine 31 based on input from a throttle input device 101. In one embodiment, brake input device 100 and throttle input device 101 each include a pedal or lever, but may include other suitable input devices. Controller 82 may also control the operation of differentials 62, 64, 66, 68 illustrated in FIG. 2. In the illustrated embodiment, vehicle controller 82 includes a processor 110 having memory 112 containing software configured to analyze inputs from various vehicle sensors for controlling brakes 102, 104 and other vehicle devices and systems.

In the illustrated embodiment, overspeed protection system 80 includes one or more speed retarders 120 for slowing or braking vehicle 10, as shown in FIG. 3. A transmission retarder 122 is configured to slow the rotational speed of transmission 51 under certain vehicle operating conditions. In the illustrated embodiment, transmission retarder 122 is a hydraulic or hydrodynamic retarder, although other types of retarders may be used. An exhaust brake 124 and/or an engine brake 126 may be further implemented in overspeed protection system 80 to facilitate speed reduction of vehicle 10. For example, exhaust brake 124 may include a valve, such as a butterfly valve, mounted in the exhaust of vehicle 10 for restricting airflow and slowing engine 31. Engine brake 126 may include an engine valve brake configured to increase compression in engine 31 to slow engine 31. In one embodiment, vehicle 10 further includes an electromagnetic retarder coupled to an axle 54, 58, 60, drive shaft 56, transmission output shaft 98, or other rotating drive line component and configured to reduce the speed of engine 31 and transmission 51. In the illustrated embodiment, controller 82 is configured to control speed retarders 120, although other controls may be used.

As illustrated in FIG. 3, a user interface 85 may be provided for the operator to access vehicle controller 82 and/or engine controller 83, for example, to modify settings or to enter instructions. User interface 85 may be of conventional design, such as a keypad or control panel, and may be positioned within cab 30. User interface 85 may include a display for providing an operator with vehicle information, such as vehicle speed, diagnostics, differential feedback, sensor information, or other vehicle parameters.

Referring to FIG. 3, engine 31 is configured to provide power to several systems or loads of vehicle 10. In addition to providing power to transmission 51, engine 31 illustratively is also configured to provide power to a hydraulic system 106 and to one or more parasitic loads 108. In the illustrated embodiment, hydraulic system 106 is coupled to transmission 51 and powered by engine 31 through transmission 51, although other configurations of hydraulic system 106 may be used. Hydraulic system 106 may include, for example, hydraulic cylinder 37 (see FIG. 1) for moving dump body 35 relative to second frame 18. In one embodiment, hydraulic system 106 further includes one or more hydraulic actuators for controlling the angle between first and second frames 14, 18 for steering vehicle 10. In one embodiment, hydraulic system may also drive a cooling and/or lubrication system of transmission 51.

Parasitic loads 108 illustratively include one or more cooling fans 94 and an air conditioner compressor 95. Cooling fans 94 are configured to cool engine 31 or other drivetrain components. In one embodiment, two cooling fans 94 are used to cool engine 31. Parasitic loads 108 may also include an alternator 97 that uses engine power for generating electrical energy used to charge vehicle batteries and to run electrical accessories. When parasitic loads 108 draw power from engine 31, the engine power available for transmission 51 and/or hydraulic system 106 may be reduced.

In the illustrated embodiment, overspeed protection system 80 is configured to automatically reduce the speed of vehicle 10 in certain operating conditions. In particular, overspeed protection system 80 is configured to reduce the rotational speed of drive train 48 components, including engine 31 and transmission 51, upon detection of vehicle 10 approaching an overspeed condition. As described herein, vehicle controller 82 is configured to monitor the rotational speed of transmission output shaft 98 (see FIG. 2) and to initiate an overspeed protection sequence upon output shaft 98 rotating at a speed that exceeds one or more predetermined speed limits. In the illustrated embodiment, the predetermined speed limits are set based on the design limits of the components of drive train 48. Controller 82 may also monitor the rotational speed of engine 31, other portions of drive shaft 56, axles 54, 58, 60, or other drive train 48 components for detecting an overspeed condition of vehicle 10.

In the illustrated embodiment, controller 82 initiates various levels of overspeed protection based on inputs 96 from vehicle sensors 114. Inputs 96 may include the speed of vehicle 10, the slope of the ground, and/or the load condition of vehicle 10. Fewer or additional inputs 96 may be provided to controller 82 for activating overspeed protection. In the illustrated embodiment, sensors 114 include a speed sensor 84, a slope sensor 86, and one or more weight sensors 92 in communication with controller 82. In one embodiment, weight sensors 92 are configured to detect the load or weight of vehicle 10.

Speed sensor 84 is configured to measure the speed of vehicle 10 and provide a signal to vehicle controller 82 representative of the measured speed. In the illustrated embodiment, speed sensor 84 is coupled to the transmission output shaft 98 for measuring the rotational speed of output shaft 98. Speed sensor 84 may also be coupled to engine 31, drive shaft 56, or one or more of axles 54, 58, 60 for detecting the speed of output shaft 98. Speed sensor 84 may alternatively measure wheel speed and/or engine speed of vehicle 10. In one embodiment, transmission controller 116 receives speed feedback provided with speed sensor 84 and provides the detected speed to vehicle controller 82. In one embodiment, speed sensor 84 includes a variable reluctance or Hall effect sensor, but any suitable sensor 84 for detecting speed may be used.

Slope sensor 86 is configured to measure the slope or grade of the ground under vehicle 10 (i.e., the inclination angle of vehicle 10) and provide a signal representative of the measured ground slope to vehicle controller 82. Slope sensor 86 may comprise a conventional inclinometer or another suitable slope angle sensor. In one embodiment, vehicle 10 may further include a brake position sensor for detecting the position of brake input device 100 and/or a brake pressure sensor for measuring the brake pressure applied by front brakes 102 and/or rear brakes 104.

Overspeed protection system 80 may include fewer or additional sensors 114 providing inputs 96 to vehicle controller 82. For example, overspeed protection system 80 may further include one or more weight sensors 92 for measuring the load condition of vehicle 10. In particular, weight sensors 92 may be used to determine the weight of a load contained in dump body 35 of vehicle 10. In one embodiment, a weight sensor 92 is coupled to each of left and right rear wheel assemblies 36a, 36b for independently measuring the weight supported by each rear wheel assembly 36a, 36b and providing signals indicative of the measured weights to controller 82. Based on the measured weights on wheel assemblies 36a, 36b, controller 82 may determine the load condition of vehicle 10.

Figure 5:
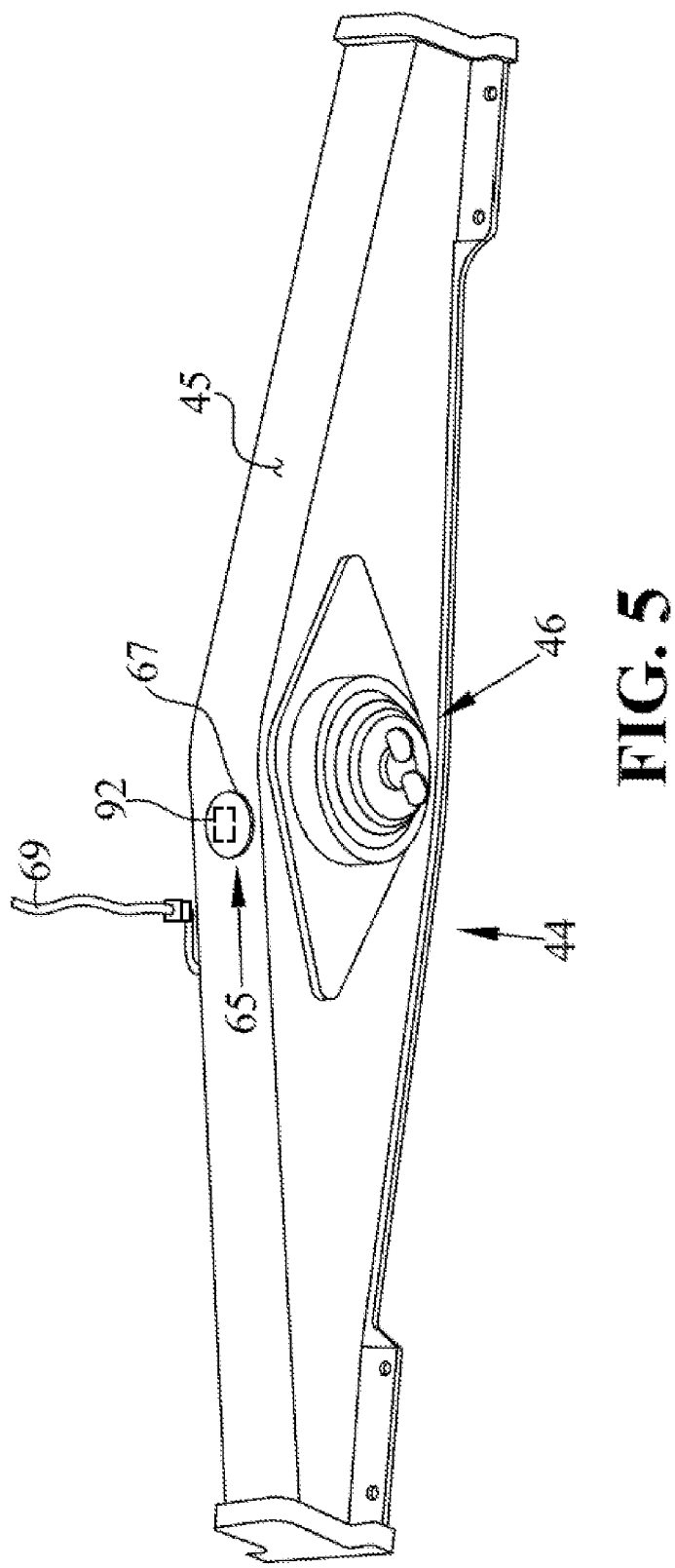
FIG. 5 illustrates an exemplary walking beam of the vehicle of FIG. 1.

Trailer portion 16 and any load contained therein may contribute to the measured weight at rear wheel assembly 33. In some conditions, the weight of cab portion 12 may also contribute to the weight on wheel assemblies 36a, 36b. In one embodiment, each weight sensor 92 includes a strain gauge mounted to a structure of rear wheel assembly 33, such as walking beam 44, for example, for detecting the weight of vehicle 10. See, for example, weight sensor 92 mounted to walking beam 44 illustrated in FIG. 5. Referring to FIG. 5, strain gauge or weight sensor 92 is positioned in a cavity 65 located in a top surface 45 of walking beam 44. In the illustrated embodiment, sensor 92 and cavity 65 are positioned near a center portion of walking beam 44 and above shaft 46 for detecting the load on beam 44, although sensor 92 may be positioned in other suitable positions. A cover 67 is provided in cavity 65 to substantially enclose sensor 92 within cavity 65. In one embodiment, a seal is provided between cover 67 and the surface forming cavity 65 to provide a sealed enclosure for sensor 92. A sensor cable 69 is configured to couple sensor 92 to controller 82 for providing feedback to controller 82. Alternatively, weight sensors 92 may include other suitable types and may be mounted at other locations suitable for measuring the weight supported by rear wheel assembly 33.

In one embodiment, one or more weight sensors 92 are coupled to front wheel assembly 32 for measuring weight supported by front wheel assembly 32. In one embodiment, based on the input from weight sensors 92, vehicle controller 82 may compare the measured weights on rear wheel assemblies 36a, 36b and front wheel assembly 32 to determine the weight distribution of vehicle 10.

In the illustrated embodiment, overspeed protection system 80 is configured to provide at least three stages or levels of overspeed protection to vehicle 10 based on the detected speed of transmission output shaft 98. When the speed of output shaft 98 reaches a first predetermined maximum speed, controller 82 initiates a first level of overspeed protection by automatically decreasing the throttle command to engine controller 83 to thereby reduce the opening of throttle plate 99 and the torque output of engine 31. As such, the speed of vehicle 10 may be reduced due to the decreased throttle command. In one embodiment, controller 82 may reduce the throttle command to a level that is below the throttle demand provided with throttle input device 101. In one embodiment, the throttle command is reduced to about zero to substantially close throttle plate 99. Controller 82 provides the reduced throttle command until the speed of output shaft 98 reaches a first deactivation speed and resumes normal operator-controlled throttle operation thereafter. In one embodiment, controller 82 employs closed loop control of the throttle command to reduce the speed of output shaft 98 to the first deactivation speed. In one embodiment, the first deactivation speed is less than the first predetermined maximum speed. Alternatively, the first deactivation speed may be substantially the same as the first predetermined maximum speed. In one embodiment, controller 82 may command an engine speed that is less than the current engine speed during the first level of overspeed protection, resulting in an automatically reduced throttle command.

When the speed of output shaft 98 reaches a second predetermined maximum speed greater than the first predetermined speed, controller 82 initiates a second level of overspeed protection by activating a retarder 120, illustratively transmission retarder 122. In the illustrated embodiment, controller 82 continues to provide the reduced throttle command during the second level of overspeed protection. As described herein, activation of transmission retarder 122 is configured to reduce the speed of output shaft 98 and vehicle 10. In one embodiment, controller 82 may also or alternatively activate one or more parasitic loads 108 in the second level of overspeed protection. Parasitic loads 108 consume power from engine 31, thereby reducing the available power of engine 31 provided to transmission 51. As such, engine 31 may deliver less power to transmission 51 during activation of parasitic loads 108, causing a speed reduction of transmission output shaft 98. Controller 82 may also activate other speed retarders 120 in the second level of overspeed protection.

In one embodiment, transmission retarder 122 is activated at full capacity until the deactivation speed is reached, although retarder 122 may alternatively be operated at variable capacity based on the speed of output shaft 98 and other operating conditions. Transmission retarder 122 may be activated until the speed of output shaft 98 reaches the first deactivation speed. Alternatively, controller 82 may deactivate retarder 122 upon the speed of output shaft 98 reaching the first predetermined maximum speed or other suitable speed. In one embodiment, controller 82 activates both transmission retarder 122 and cooling fans 94 of parasitic loads 108 to reduce the speed of transmission output shaft 98.

When the speed of output shaft 98 reaches a third predetermined maximum speed greater than the second predetermined speed, controller 82 initiates a third level of overspeed protection by automatically applying at least one of front brakes 102 and rear brake 104 to reduce the speed of output shaft 98. In the illustrated embodiment, controller 82 applies a braking force with at least one of front brakes 102 and rear brake 104 based on the detected deceleration rate of vehicle 10 or transmission 51. In particular, controller 82 may apply a varying braking command to maintain the deceleration rate of output shaft 98 within a predetermined range of values. If the detected deceleration rate exceeds a maximum value, controller 82 may decrease or remove the automatic application of brakes 102, 104 to reduce the likelihood of wheel locking or skidding. In one embodiment, controller 82 removes the braking command until the detected deceleration rate is within the accepted range of values. If the detected deceleration rate falls below a minimum value, controller 82 may increase the applied brake pressure to increase the effective braking of vehicle 10. In one embodiment, controller 82 may apply a near maximum braking force with brakes 102, 104 before reducing the braking force upon the detected deceleration rate exceeding a maximum value.

In one embodiment, controller 82 automatically applies brakes 102, 104 during the third level of overspeed protection until the speed of output shaft 98 reaches a second deactivation speed. In the illustrated embodiment, the second deactivation speed is less than the first deactivation speed. Alternatively, controller 82 may apply brakes 102, 104 until the speed of output shaft 98 decreases to the first deactivation speed, the first or second predetermined maximum speed, or some other suitable speed. As described herein, controller 82 may monitor the deceleration rate of vehicle 10 during the third level of overspeed protection and modulate the automatically applied braking force to reduce the likelihood of vehicle 10 losing traction and skidding.

Figure 4:
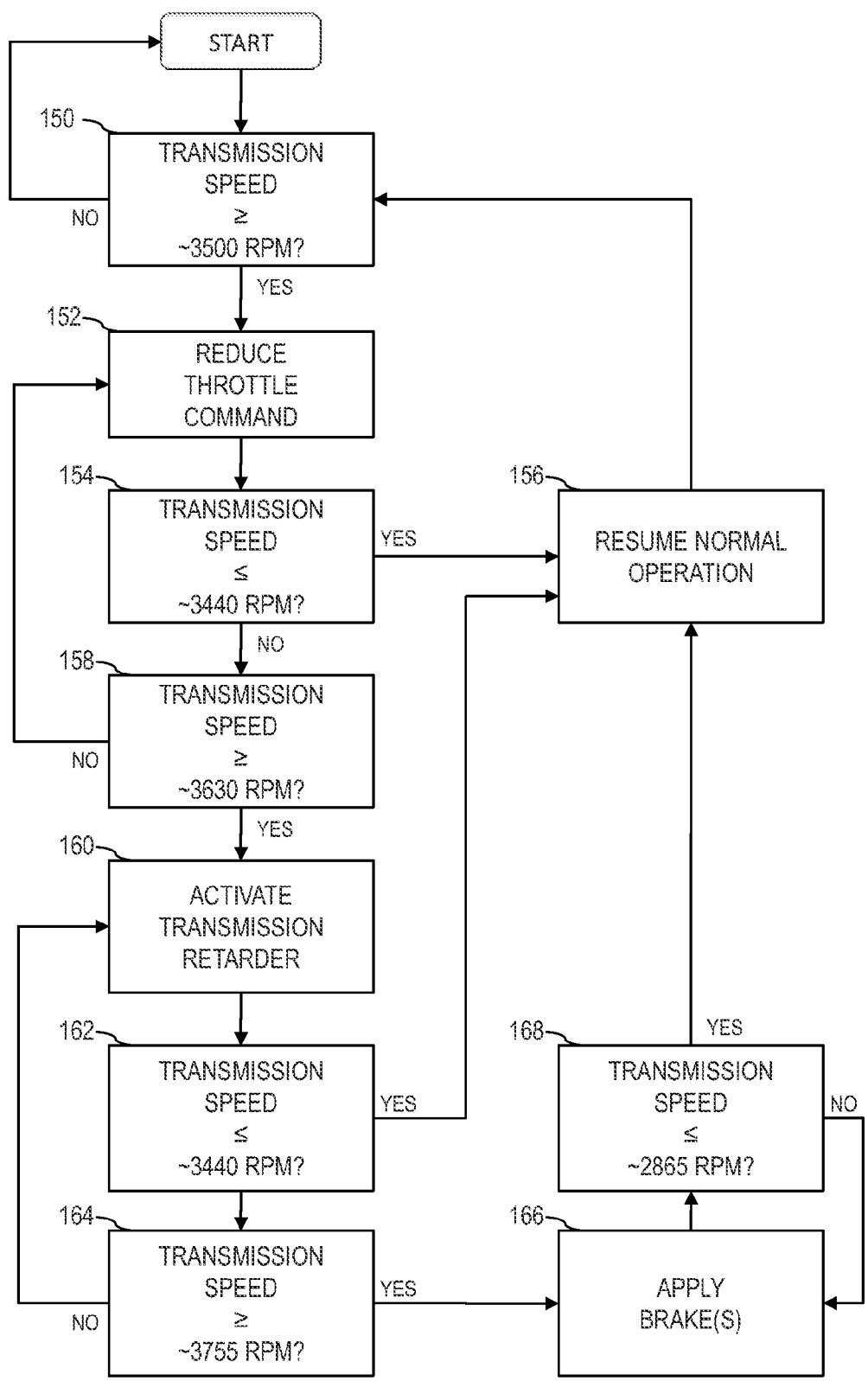
FIG. 4 illustrates an exemplary overspeed protection method for the vehicle of FIG. 1.

Referring to FIG. 4, an exemplary method of providing overspeed protection to vehicle 10 is illustrated. The following describes the method of FIG. 4 with reference to overspeed protection system 80 of FIG. 3. At block 150, controller 82 compares the speed of output shaft 98 to a first predetermined maximum speed of about 3500 revolutions per minute (rpm). If the speed is greater than about 3500 rpm, controller 82 implements the first level of overspeed protection at block 152 by reducing the throttle command to engine 31. Controller 82 continues the reduced throttle command until the speed of output shaft 98 decreases to a first deactivation speed of about 3440 rpm, as illustrated at block 154. Once the speed of output shaft 98 is reduced to less than about 3440 rpm, controller 82 resumes normal throttle operation at block 156 by removing the first level of overspeed protection. In one embodiment, normal throttle operation includes operator-controlled throttle operation.

If the speed of output shaft 98 continues to increase until it reaches a second predetermined maximum speed of about 3630 rpm, controller 82 implements the second level of overspeed protection by activating transmission retarder 122, as represented by blocks 158 and 160. In one embodiment, controller 82 activates transmission retarder 122 and one or more parasitic loads 108 at block 160. In one embodiment, controller 82 activates transmission retarder 122, cooling fans 94, and air conditioner compressor 95 at block 160, although other combinations of parasitic loads 108 may be activated at block 160. Controller 82 continues the reduced throttle command and the activation of transmission retarder 122 until the speed of output shaft 98 decreases to the first deactivation speed of about 3440 rpm, as represented by block 162. Once the speed of output shaft 98 is reduced to less than about 3440 rpm, controller 82 resumes normal operation of vehicle 10 at block 156 by removing the first and second levels of overspeed protection.

If the speed of output shaft 98 continues to increase until it reaches a third predetermined maximum speed of about 3755 rpm, controller 82 implements the third level of overspeed protection by automatically engaging at least one of brakes 102, 104, as represented by blocks 164 and 166. In the illustrated embodiment, brakes 102a, 102b, and 104 are activated at block 166. In the illustrated embodiment, the brake pressure automatically applied with brakes 102, 104 is modulated or varied based on the deceleration rate of transmission output shaft 98 or another component of drive train 48, as described herein. Controller 82 continues the application of brakes 102, 104 until the speed of output shaft 98 decreases to a second deactivation speed of about 2865 rpm, as illustrated at block 168. Once the speed of output shaft 98 is reduced to less than about 2865 rpm, controller 82 resumes normal operation of vehicle 10 at block 156 by removing the first, second, and third levels of overspeed protection. Alternatively, other speeds of output shaft 98 may trigger the deactivation of brakes 102, 104. For example, controller 82 may remove brakes 102, 104 upon vehicle 10 reaching the first deactivation speed of 3440 rpm or some other speed. Similarly, controller 82 may remove each level of overspeed protection at different speeds. For example, controller 82 may discontinue the decreased throttle command and application of transmission retarder 122 and/or cooling fans 94 at the first deactivation speed of 3440 rpm and remove application of brakes 102, 104 at the second deactivation speed of 2865 rpm.

Other speed setpoints may be used for the first and second deactivation speeds and the predetermined maximum speeds. In one embodiment, the speed setpoints are determined based on the design limits of the components of drive train 48 to protect vehicle 10 from an overspeed condition.

In one embodiment, controller 82 may apply variable brake pressure with brakes 102, 104 during the third level of overspeed protection based on the operating conditions of vehicle 10. In addition to adjusting the applied brake pressure based on the deceleration rate of output shaft 98, as described herein, controller 82 may adjust the applied brake pressure of brakes 102, 104 based on the load condition of vehicle 10, the slope angle of the ground, and/or other vehicle parameters. Similarly, controller 82 may vary the throttle command and the application of transmission retarder 122 and/or parasitic loads 108 during the first and second levels of overspeed protection depending on the acceleration, load, and slope of vehicle 10.

For example, controller 82 may vary the application of brakes 102, 104 based on the measured inclination angle of vehicle 10. In one embodiment, a greater brake pressure is applied with brakes 102, 104 when a greater inclination angle is detected. In one embodiment, controller 82 may increase the brake pressure upon the inclination angle exceeding one or more predetermined threshold angles. Controller 82 may also vary the application of brakes 102, 104 based on the acceleration rate of vehicle 10 prior to implementation of the third level of overspeed protection. Controller 82 may apply a greater brake pressure with brakes 102, 104 when a greater acceleration rate is detected.

Further, controller 82 may vary the application of brakes 102, 104 based on the load conditions of vehicle 10. A greater load in dump body 35 may result in greater inertia and kinetic energy of a moving vehicle 10. As such, controller 82 may increase the brake pressure upon detection of a load in dump body 35. Controller 82 may also apply a brake pressure that is proportional to the measured weight of the load in dump body 35. In one embodiment, the load conditions of vehicle 10 are determined with one or more weight sensors 92, as described herein.

In one embodiment, the automatic application of brakes 102, 104 by controller 82 during the third level of overspeed protection may depend on the position of brake input device 100. For example, an operator may actuate brake input device 100 during the third level of overspeed protection to provide a brake request to controller 82. In such a condition, controller 82 may default to the greater of the brake requests (i.e., the larger requested braking force) provided with brake input device 100 and overspeed protection system 80.

While overspeed protection system 80 is described herein with respect to articulated vehicle 10, overspeed protection system 80 may be implemented on other types of vehicles. For example, overspeed protection system 80 may be implemented in other work or utility vehicles such as a motor grader, a tractor, a bulldozer, a feller buncher, a crawler, an excavator, a skidder, or another utility vehicle. Similarly, overspeed protection system 80 may also be implemented in a commercial vehicle or other roadworthy motor vehicles.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A work vehicle including:
   an engine including a throttle device;
   a transmission coupled to the engine;
   a chassis including a cab portion, a trailer portion, and a coupling device positioned between the cab portion and the trailer portion, the cab portion including a first frame and the trailer portion including a second frame, the coupling device being configured to provide pivoting movement of the trailer portion relative to the cab portion;
   a front wheel assembly configured to support the cab portion, the front wheel assembly including a first axle and a pair of wheels coupled to the first axle;
   a rear wheel assembly configured to support the trailer portion, the rear wheel assembly including a second axle and a pair of wheels coupled to the second axle;
   a drive shaft coupled between the first wheel assembly and the second wheel assembly;
   a brake coupled to at least one of the front and rear wheel assemblies and configured to apply a braking force to the at least one of the front and rear wheel assemblies;
   a sensor configured to detect a speed of the vehicle; and
   a controller in communication with the brake and the sensor, the controller being configured to control an opening of the throttle device of the engine, the controller being configured to automatically reduce the opening of the throttle device upon the detected vehicle speed being outside a first threshold range and to automatically actuate the brake upon the detected vehicle speed being outside a second threshold range, the second threshold range being greater than the first threshold range.

2. The work vehicle of claim 1, wherein the first threshold range includes vehicle speeds less than a first maximum speed and the second threshold range includes vehicle speeds less than a second maximum speed, the first maximum speed being less than the second maximum speed.

3. The work vehicle of claim 2, wherein the vehicle speed includes a rotational speed of the transmission, wherein the first maximum speed is about 3500 revolutions per minute and the second maximum speed is about 3750 revolutions per minute.

4. The work vehicle of claim 2, wherein the controller is configured to resume a normal operation of the throttle device upon the detected vehicle speed being less than a first deactivation speed and to release the automatically applied brake upon the detected vehicle speed being less than a second deactivation speed, the first and second deactivation speeds being less than the first and second maximum speeds.

5. The work vehicle of claim 4, wherein the first deactivation speed is greater than the second deactivation speed.

6. The work vehicle of claim 4, wherein the detected vehicle speed includes a rotational speed of the transmission, wherein the first deactivation speed is about 3440 revolutions per minute and the second deactivation speed is about 2865 revolutions per minute.

7. The work vehicle of claim 2, further including a transmission retarder coupled to the transmission and at least one parasitic load coupled to the engine, the engine being configured to provide power to the at least one parasitic load, the controller being configured to activate at least one of the transmission retarder and the at least one parasitic load upon the detected vehicle speed being greater than a third maximum speed, the third maximum speed being greater than the first maximum speed and less than the second maximum speed.

8. The work vehicle of claim 7, wherein the detected vehicle speed includes a rotational speed of the transmission, wherein the first maximum speed is about 3500 revolutions per minute, the second maximum speed is about 3750 revolutions per minute, and the third maximum speed is about 3630 revolutions per minute.

9. The work vehicle of claim 7, wherein the at least one parasitic load includes at least one of a cooling fan, an air conditioning compressor, and an alternator.

10. The work vehicle of claim 1, wherein the controller is configured to monitor a deceleration rate of the vehicle based on the detected vehicle speed, the controller varying the braking force applied with the brake based on the deceleration rate of the vehicle.

11. The work vehicle of claim 10, wherein the controller reduces the braking force applied with the brake upon the deceleration rate of the vehicle exceeding a predetermined maximum value.

12. The work vehicle of claim 1, wherein the brake is coupled to the first axle of the front wheel assembly, further including a second brake coupled to the second axle of the rear wheel assembly, the controller being configured to automatically actuate the brake and the second brake upon the detected vehicle speed being outside the second threshold range.

13. A vehicle including:
   a front portion including a front frame, an engine supported by the front frame, and a transmission coupled to the engine;
   at least one of a retarder coupled to the transmission and a parasitic load coupled to the engine, activation of the at least one of the retarder and the parasitic load being configured to inhibit a rotation of the transmission;
   a front wheel assembly operably coupled to the front frame to support the front portion, the front wheel assembly including a first axle and a pair of wheels coupled to the first axle;
   a trailer portion including a rear frame;
   a rear wheel assembly operably coupled to the rear frame to support the trailer portion, the rear wheel assembly including a second axle and a pair of wheels coupled to the second axle;

a frame coupling positioned between the front frame and the rear frame, the frame coupling being configured to provide pivoting movement between the front frame and the rear frame;

a drive shaft coupled between the front wheel assembly and the rear wheel assembly;

a brake coupled to at least one of the front and rear wheel assemblies and configured to apply a braking force to the at least one of the front and rear wheel assemblies;

a sensor configured to detect a speed of the transmission; and a controller in communication with the brake, the sensor, and the at least one of the retarder and the parasitic load, the controller being configured to automatically activate the at least one of the retarder and the parasitic load upon the detected transmission speed being outside a first threshold range and to automatically actuate the brake upon the detected transmission speed being outside a second threshold range, the second threshold range being greater than the first threshold range.

14. The vehicle of claim 13, wherein the engine includes a throttle configured to regulate air intake into the engine, the controller being configured to provide a throttle demand for controlling a position of the throttle, the controller being configured to automatically reduce the throttle demand upon the detected transmission speed being outside a third threshold range, the third threshold range being less than the first threshold range and the second threshold range.

15. The vehicle of claim 14, wherein the first threshold range includes transmission speeds less than a first maximum speed, the second threshold range includes transmission speeds less than a second maximum speed, and the third threshold range includes speeds less than a third maximum speed, the third maximum speed being less than the first maximum speed, the first maximum speed being less than the second maximum speed.

16. The vehicle of claim 15, wherein the first maximum speed is about 3630 revolutions per minute, the second maximum speed is about 3750 revolutions per minute, and the third maximum speed is about 3500 revolutions per minute.

17. The vehicle of claim 14, wherein the controller is configured to resume a normal operation of the throttle and to deactivate the at least one of the retarder and the parasitic load upon the detected transmission speed being within a first deactivation range, wherein the controller is configured to release the automatically applied brake upon the detected transmission speed being within a second deactivation range, the first deactivation range being greater than the second deactivation range.

18. The vehicle of claim 17, wherein the first deactivation range includes transmission speeds less than about 3440 revolutions per minute and the second deactivation range includes transmission speeds less than about 2865 revolutions per minute.

19. The vehicle of claim 13, wherein the at least one parasitic load includes at least one of a cooling fan, an air conditioning compressor, and an alternator.

20. The vehicle of claim 13, wherein the controller is configured to monitor a deceleration rate of the transmission based on the detected transmission speed, the controller varying the braking force applied with the brake based on the deceleration rate of the transmission.

21. The vehicle of claim 20, wherein the controller reduces the braking force applied with the brake upon the deceleration rate of the transmission exceeding a predetermined maximum value.

22. An overspeed protection method for a vehicle, the method including:
providing a vehicle including a cab portion, a trailer portion, a drive train, and a coupling device positioned between the cab portion and the trailer portion, the coupling device being configured to provide pivoting movement between the trailer portion and the cab portion, the cab portion including a front wheel assembly and the trailer portion including a rear wheel assembly, at least one of the front wheel assembly and the rear wheel assembly including a brake, the drive train including an engine and a transmission coupled to the engine;
detecting a speed of the drive train;
comparing the detected speed to a first threshold range;
reducing a throttle demand to the engine upon the detected speed being outside the first threshold range;
comparing the detected speed to a second threshold range, the second threshold range being greater than the first threshold range; and
activating the brake upon the detected speed being outside the second threshold range.

23. The method of claim 22, wherein the first threshold range includes drive train speeds less than a first maximum speed and the second threshold range includes drive train speeds less than a second maximum speed, the first maximum speed being less than the second maximum speed.

24. The method of claim 23, wherein the drive train speed includes a rotational speed of the transmission, wherein the first maximum speed is about 3500 revolutions per minute and the second maximum speed is about 3750 revolutions per minute.

25. The method of claim 23, further including the steps of terminating the reducing step upon the detected speed being less than a first deactivation speed and terminating the activating step upon the detected speed being less than a second deactivation speed, the first and second deactivation speeds being less than the first and second maximum speeds.

26. The method of claim 25, wherein the detected speed includes a rotational speed of the transmission, wherein the first deactivation speed is about 3440 revolutions per minute and the second deactivation speed is about 2865 revolutions per minute.

27. The method of claim 22, the vehicle further including a transmission retarder coupled to the transmission and at least one parasitic load coupled to the engine, the engine being configured to provide power to the at least one parasitic load, further including the step of activating at least one of the transmission retarder and the at least one parasitic load upon the detected speed being outside a third threshold range, the third threshold range being greater than the first threshold range and less than the second threshold range.

28. The method of claim 27, wherein the detected speed includes a rotational speed of the transmission, wherein the first threshold range includes speeds less than about 3500 revolutions per minute, the second threshold range includes speeds less than about 3750 revolutions per minute, and the third threshold range includes speeds less than about 3630 revolutions per minute.

29. The method of claim 22, further including the steps of monitoring a deceleration rate of the drive train based on the detected speed and varying a braking force of the brake based on the deceleration rate.

30. The method of claim 29, wherein the varying step includes reducing the braking force upon the deceleration rate of the drive train exceeding a maximum threshold value.

* * * * *